(12) United States Patent
Olson (10) Patent No.: US 12,406,131 B2
(45) Date of Patent: Sep. 2, 2025

(54) SYSTEM AND INTERFACE FOR ADAPTIVE WEB CONTENT

(71) Applicant: Quad/Graphics, Inc., Sussex, WI (US)

(72) Inventor: Kenneth Stanley Olson, Morrisville, NC (US)

(73) Assignee: Quad/Graphics, Inc., Sussex, WI (US)

( * ) Notice: Subject to any disclaimer, the term of this patent is extended or adjusted under 35 U.S.C. 154(b) by 429 days.

(21) Appl. No.: 18/093,645

(22) Filed: Jan. 5, 2023

(65) Prior Publication Data

US 2023/0214576 A1 Jul. 6, 2023

Related U.S. Application Data

(60) Provisional application No. 63/296,765, filed on Jan. 5, 2022.

(51) Int. Cl.
| | |
|---|---|
| *G06F 40/106* | (2020.01) |
| *G06F 40/134* | (2020.01) |
| *G06F 40/154* | (2020.01) |
| *G06F 40/166* | (2020.01) |
| *G06K 19/06* | (2006.01) |
| *G06Q 30/0251* | (2023.01) |

(52) U.S. Cl.
CPC .......... *G06F 40/106* (2020.01); *G06F 40/134* (2020.01); *G06F 40/154* (2020.01); *G06F 40/166* (2020.01); *G06K 19/06037* (2013.01); *G06Q 30/0251* (2013.01); *G06T 2200/24* (2013.01)

(58) Field of Classification Search
CPC .................................................. G09G 2380/04
See application file for complete search history.

(56) References Cited

U.S. PATENT DOCUMENTS 7,152,040 B1 * 12/2006 Hawthorne ........ G06Q 30/0207
705/14.1
8,231,017 B2  7/2012 Clontz et al.
(Continued)

FOREIGN PATENT DOCUMENTS

CA      2853996 A1    12/2015

OTHER PUBLICATIONS

International Search Report (ISR) and Written Opinion of the Searching Authority in Appln. No. PCT/US2016/060181, dated as mailed Mar. 10, 2017.

*Primary Examiner* — Asher D Kells
(74) *Attorney, Agent, or Firm* — Becker Patent Law, LLC (57) ABSTRACT

Web content display devices of various size, orientation, and other capabilities may be flexibly positioned on retail shelving or in other locations within a retail store or other space. A display device may be configured to display various information, including information served directly from a pre-existing web location such as a retail store product page, or a pre-existing advertising platform or interface. Web content requests and responses are managed by an adaptive content interface configured on the web content display device or a remote server. The interface is configured to identify a subset of web content within a response and automatically reorganize, restyle, and/or revise the subset of web content for display on the display device. The interface also interprets sensor output from the display device in order to generate clicks or impressions in a form recognizable by the advertising interface.

20 Claims, 7 Drawing Sheets

(56) References Cited

U.S. PATENT DOCUMENTS

| | | |
|---|---|---|
| 8,403,535 B1 | 3/2013 | Keith, Jr. |
| 8,472,174 B2 | 6/2013 | Idems et al. |
| 9,679,310 B1* | 6/2017 | Saltzstein .......... G06Q 30/0267 |
| 2003/0115096 A1 | 6/2003 | Reynolds et al. |
| 2005/0047895 A1 | 3/2005 | Lert |
| 2008/0212314 A1 | 9/2008 | Swofford et al. |
| 2009/0273443 A1* | 11/2009 | Nilsson ................... G06F 3/147 |
| | | 340/5.91 |
| 2010/0145506 A1 | 6/2010 | Waugh et al. |
| 2011/0116219 A1 | 5/2011 | Delva et al. |
| 2013/0117153 A1 | 5/2013 | Shen |
| 2014/0139548 A1 | 5/2014 | Byers |
| 2014/0263866 A1 | 9/2014 | Hemmer |
| 2015/0110476 A1 | 4/2015 | Walker |
| 2015/0262269 A1 | 9/2015 | Zamer |
| 2016/0034988 A1 | 2/2016 | Howard et al. |
| 2016/0134930 A1 | 5/2016 | Swafford |
| 2017/0093104 A1 | 3/2017 | Powers et al. |
| 2024/0402525 A1* | 12/2024 | Liu ................... G02F 1/133526 |

* cited by examiner

SYSTEM AND INTERFACE FOR ADAPTIVE WEB CONTENT

PRIORITY

This application claims the priority of U.S. Provisional Patent 63/296,765, filed Jan. 5, 2022, and titled "System and Interface for Adaptive Web Content," the entire disclosure of which is incorporated herein by reference.

FIELD

The disclosed technology pertains to a system for adapting web content in real time for presentation.

BACKGROUND

Creating, managing, and providing web content is an important aspect of many businesses. For brick and mortar retailers, web content serves to drive activity at brick and mortar locations, but increasingly also drives activity towards online shopping options that are conducted from brick and mortar locations or dedicated facilities—both of which provide significant value. For some other businesses, web content is an even more critical aspect of their business—such as product information or review aggregators, or platforms operating in advertisement buying, selling, and delivery spaces.

Especially in the advertising space, provision of web content can be a significant challenge. Ad-blocker software and scripting safeguards have become commonplace, and often are built directly into a consumer's web browser or other software without the consumer being entirely aware of their presence, thereby reducing the potential audience. An additional challenge is the growing variety of audience device characteristics. The explosive growth of options in browsers, devices (personal computers, smartphones, tablets, and other web connected devices such as televisions, game systems, etc.), display sizes, display resolutions, and other characteristics makes it impossible to fully test and customize web content across all available presentation scenarios. Web content is often statically sized and presented, or at most may be presented from one of several preconfigured options based upon browser or device detection (e.g., two pieces of static web content may be defined, and may be alternately served based upon identification of particular requesting browser).

Thus there is a need to increase the number of audience devices that web content can be presented to, but that need is in conflict with the static nature of such web content. This conflict is magnified by the complexity of websites and advertising platforms. A first party website often integrates two or more different third party advertising platforms over which they have limited control, even where they are technically the customer. As a result, such web content must be taken and used as is, even where it is not readily presentable on the intended device or setting.

What is needed, therefore, is an improved system for adapting and serving web content in real time.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of adaptive serving of web content. While the disclosed applications of the inventors' technology satisfy a long-felt but unmet need in the art of adaptive serving of web content, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
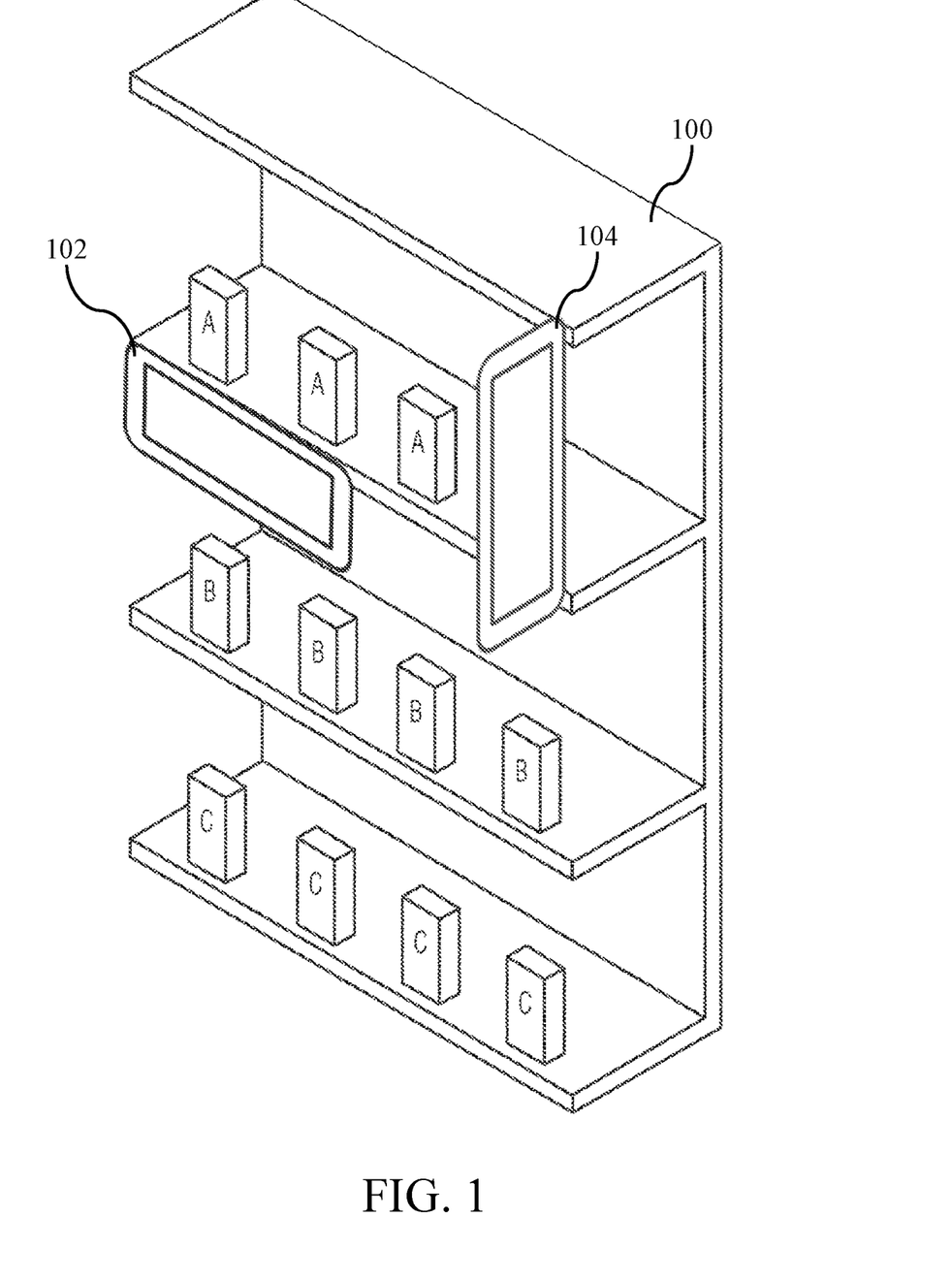
FIG. 1 is a front perspective view of a retail shelf that includes several flexibly positioned web content display devices.

FIG. 1 is a front perspective view of a retail shelf (100) that includes several flexibly positioned web content display devices (102, 104). Display devices (102, 104) may be mounted at varying heights, positions, and orientations (e.g., vertical (104), horizontal (102), diagonal) on the shelf (100), and may also be positioned on walls, columns, horizontal surfaces such as desks or tables, and in various other areas as may be desirable. Display devices (102, 104) may include a battery or hardwired power source, may include wireless communication devices or other networking capabilities, and may include or be compatible with mounts of various types (e.g., adhesive mounts, magnetic mounts, mechanical holders or fixtures such as bolt-on or clip mounts) to allow for flexible positioning on shelves. Display devices (102, 104) may be positioned at a location semi-permanently and connected to a power source, or may be positioned at a location temporarily and powered by a battery, and may be replaced from time-to-time with a different display device that has a fully charged battery.

Figure 2:
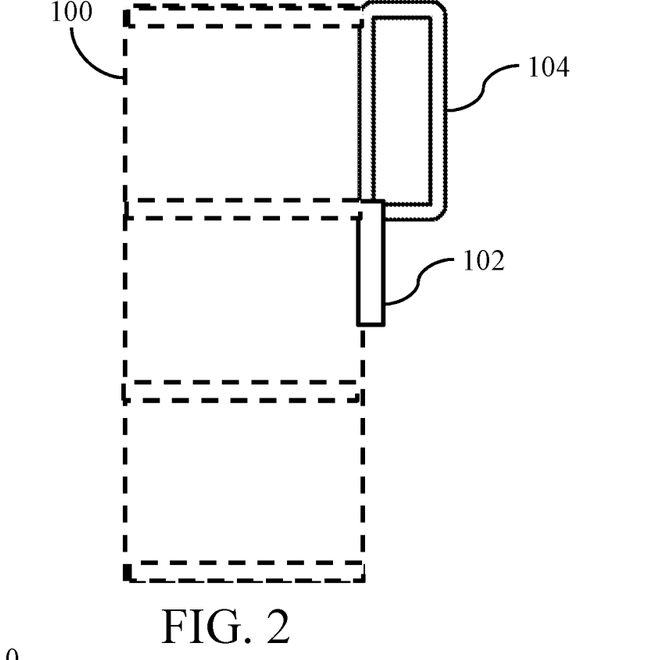
FIG. 2 is a side elevation of the shelf of FIG. 1, with the structure of the shelf illustrated by dashed lines.

FIG. 2 is a side elevation of the shelf (100) of FIG. 1, with the structure of the shelf (100) illustrated by dashed lines. Some implementations of display devices (102, 104) may have a form factor with a relatively narrow width compared to their height, such that when mounted as shown in FIG. 2 the face is clearly presented to an audience while minimizing the incursion into the audience's walking path. A narrow face may be desirable compared to typical form factors used by smartphones, tablets, or other mobile computing devices for this reason.

Figure 3:
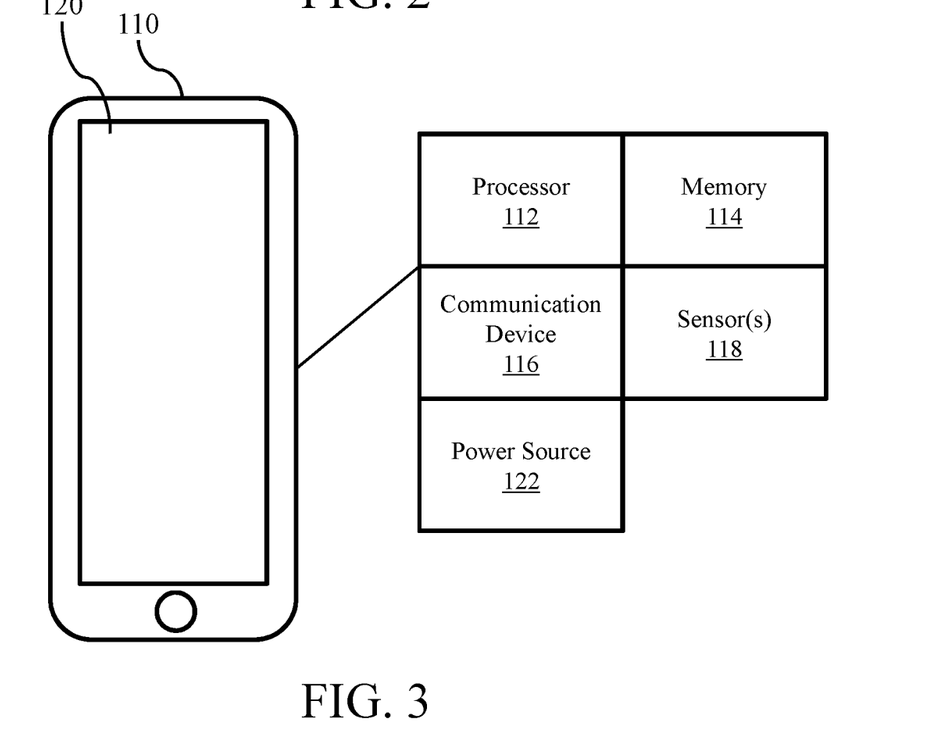
FIG. 3 is a partial schematic diagram showing a web content display device such as may be mounted at varying locations and orientations on the shelf of FIG. 1.

FIG. 3 is a partial schematic diagram showing a web content display device (110) such as may be mounted at varying locations and orientations on the shelf (100) of FIG. 1. The display device may include a display (120), and one or more sensors (118), such as a front and/or rear facing camera, a light sensor, motion sensors, depth sensor, GPS sensor, or gyroscopic sensor, for example. The display device (110) may also include one or more processors (112), memories (114), communication devices (116) (e.g., Wi-Fi, Bluetooth, RFID, NFC), power sources (122) (e.g., battery, hardwired, solar), and other computing components such as may be used in receiving, transmitting, analyzing, modifying, and storing data. The display device (110) differs from conventional tablet devices or mobile computing devices in several ways. As one example, the web content display device may have a form factor or aspect ratio of varying size, whereas conventional computing devices tend to have size ratios selected from within a narrow range (e.g., 16:9, 4:3). This preference towards a narrow range is due to usability concerns, as well as compatibility with existing software, websites, web content, and other content types. The display device (110) can deviate far outside the range of these conventions (e.g., a 2:1 aspect ratio, a 3:1 aspect ratio) because it is not subject to typical usability concerns, and because the device is configured to adapt content for display in real-time, so it is not subject to typical compatibility concerns.

As another example, the web content display device (110) may not include any user facing buttons, controls, touchscreen interfaces, or other integrated user inputs as may be typically found in conventional computing devices. This again is possible because the web content display device is not intended to be used or interacted with as one might use a conventional tablet—a user may view displayed content, and may interact with that content through their own user device (as will be described in more detail below), but need not touch or otherwise physically interact with the displayed content as would be typical.

Figure 4A:
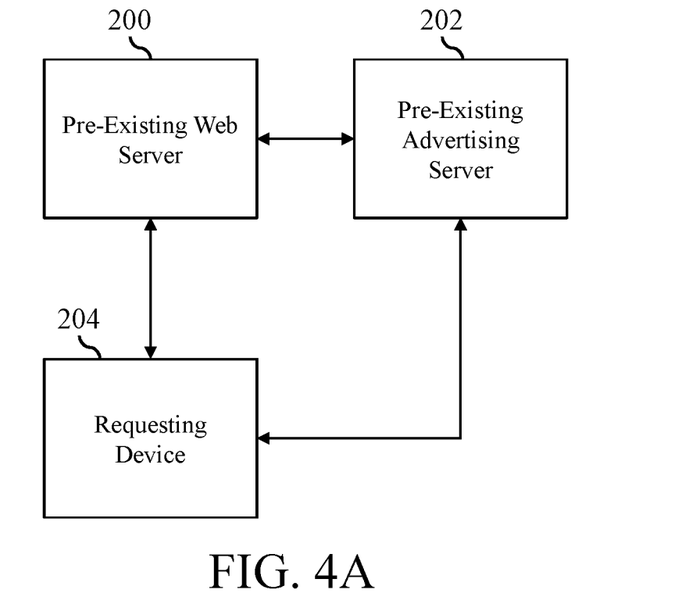
FIG. 4A is a schematic diagram illustrating a conventional system for providing advertisement web content.
Figure 4B:
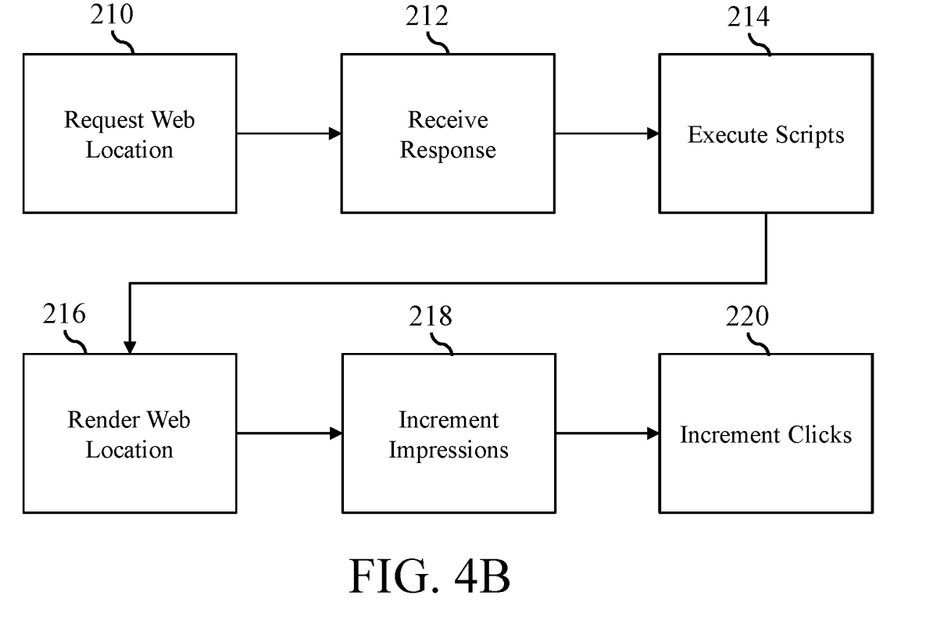
FIG. 4B is a flowchart of a conventional set of steps that may be performed to provide advertisement web content.

FIGS. 4A and 4B illustrate aspects of conventional systems and platforms for delivering advertisement content as part of web content. A requesting device (204) (e.g., a smartphone) requests (210), typically through a web browser application, web content that is associated with a particular web location (e.g., a URL, including a named domain or an IP address). When receiving (212) the requested web content from a pre-existing web server (200), the web server may request and insert advertisement content from a pre-existing advertising server (202), or may provide scripts that, when executed (214) on the client device, request advertisement content directly from the pre-existing advertising server (202). The received content, including advertisement and non-advertisement content, is then rendered (216) or otherwise executed on the requesting device (204), and the system may also increment impressions (218) (e.g., a number indicating the number of advertisements served to an audience) or clicks (220) (e.g., a number indicating the number of audience members that have clicked on a served advertisement) based on information from the pre-existing advertising server (202), the requesting device (204), or both.

This conventional approach is inconvenient and inefficient for use with the web content display devices for at least the reasons described above. For example, both advertising and non-advertising content served from the pre-existing servers is designed for and compatible with display within a relatively narrow range of devices, and so would be incapable of displaying across display devices of varying sizes (e.g., a 2:1 or 3:1 aspect ratio) without significant manual redesign. In some cases, such as where advertising content is being delivered from a third party advertising platform, such manual redesign is not possible, and even where possible this is an inefficient approach for integrating flexibly sized display devices into the pre-existing systems.

Figure 5A:
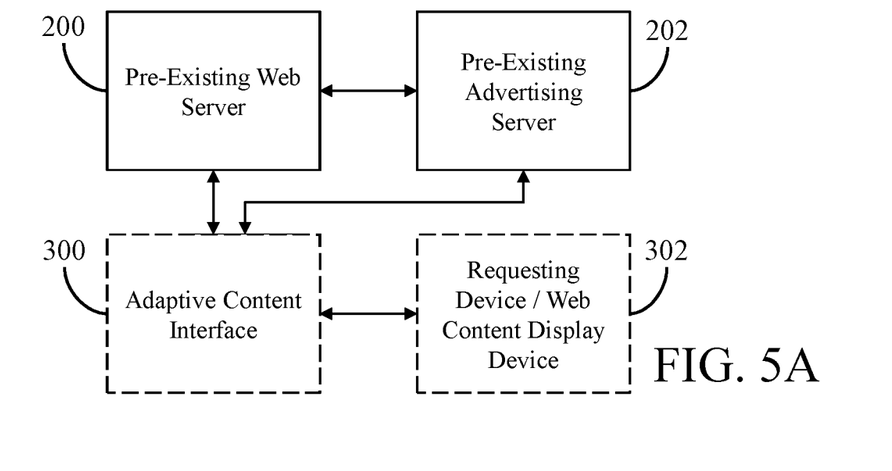
FIG. 5A is a schematic diagram illustrating an improved system for providing advertisement web content.
Figure 5B:
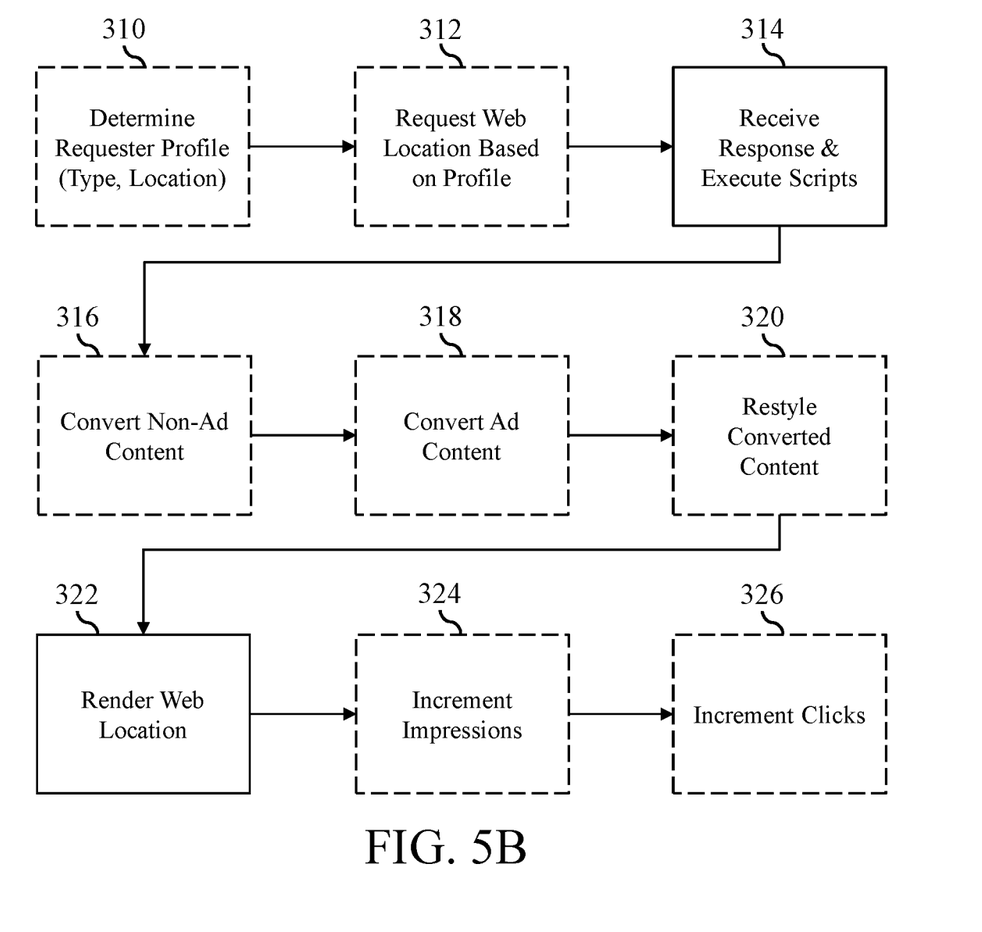
FIG. 5B is a flowchart of an improved set of steps that may be performed to provide advertisement web content.

To address these issues and others, FIG. 5A and FIG. 5B show aspects of the disclosed system and interface for serving adaptive web content. Components or steps that are similar or identical to those shown in the conventional system are illustrated by solid line boxes, while those that are new, modified, or otherwise unconventional are illustrated by dashed line boxes. An adaptive content interface (300) is configured as an intermediary between the pre-existing systems (200, 202) and the requesting device (302), which in this case is a web content display device (e.g., such as the device (110)) of varying size, orientation, or other capability. As has been described, the web content display device may have an aspect ratio outside the conventional range for mobile computing devices and computer displays (e.g., 2:1, 5:1, or as otherwise may be desired), and may be oriented vertically, horizontally, or diagonally relative to the intended audience.

The adaptive content interface (300) may be configured and executed on the web content display device, on a remote server in communication with the web content display device, or across both, in varying implementations. In some implementations, the adaptive content interface (300) may be a web browser application configured on the web content display device, and may be configured to retrieve configurations and settings from a remote server each time it is positioned in a particular display location. The display location may be communicated to the web content display device in varying ways, and may include, for example, manually via user input (e.g., via a temporarily attached keyboard, mouse, wireless device, or other input device), manually via other input (e.g., a retail shelf or other display position having pre-configured settings may be marked with a QR code or other optical code, or a RFID tag or other wireless tag, any of which the web content display device is capable of scanning), automatically (e.g., based on a GPS location, or where installation of the device in a shelf mount positions an RFID or other wireless reader of the device in proximity to a corresponding tag in the shelf mount), or in other ways. In this manner, display devices can be quickly configured for operation in a particular location, and such configurations may be persistent even where the display device is replaced in the event of damage or hardware error, or even where it is swapped for a device with a fresh battery.

Turning now to FIG. 5B, once the web content display device is configured and positioned, the system may determine (310) a requester profile for the device and may request (312) web content from a configured location and/or with certain request parameters based on the requester profile. Many advertising systems serve content based on a requester profile which may describe known or inferred information about the user. This may include information the user provides when registering for a particular website (e.g., a user registering for a retail store may identify categories of products they are interested in, which may influence the advertisements they receive at that retail store's website and in other web locations), or may include information inferred from the user's general web activity (e.g., as stored in "cookies" or other tracking technologies).

Since the web content display device is not unique to a single user, or even a small number of users this requester profile would typically be blank or unknown, which may exclude certain content from being displayed by the device. To accommodate the structures of the pre-existing systems, the web content display device may instead generate a pseudo-requester profile based on manual configurations and automatic processes, with the intent that the pseudo-requester profile will represent the audience that will be walking by or otherwise viewing the web content display device. As an example, a device configured for use in a home improvement retail store may be configured with a pseudo-requester profile indicating an interest in home improvement products and services. As another example, a device configured for use in an Ohio retail location may be automatically configured, based upon GPS or other location information, with a pseudo-requester profile indicating they are located in Ohio. In such cases, the devices might then display content that would otherwise not be displayed to a requester having a blank requester profile.

After the requested content is received, any scripts or other assets may be executed (314) or retrieved so that the entire body of web content is available to the adaptive content interface. The system may then identify and convert (316) any non-advertisement content for display, may identify and convert (318) any advertisement content for display, and may restyle (320) the remaining converted content for display on a particular web content display device, each as will be described in more detail below. The system may then render (322) and display the remaining converted content from the web location on the web content display device so that the content is visible to nearby shoppers or other audience members.

In some implementations, the system may also track audience members (e.g., those walking by the device, stopping in front of the device, or otherwise detectable by the sensors of the device for a minimum period of time) during presentation of certain advertising content, and report impressions (324) to the pre-existing advertising system based thereon. The system may also track audience member interactions with the device (e.g., scanning a QR code, RFID tag, NFC transmitter, or other interaction), and report clicks (326) to the pre-existing advertising system based thereon. This may be advantageous in that it can capture certain user metrics (impressions, clicks) that would otherwise be lost, and can provide those metrics to the pre-existing advertising system with minimal or no changes required to that advertising system.

Figure 6:
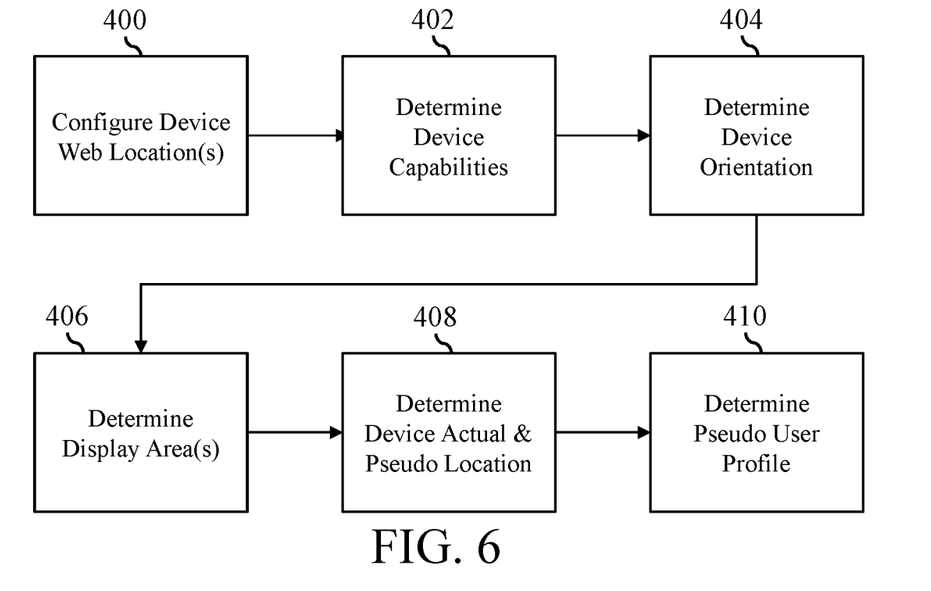
FIG. 6 is a flowchart of a set of steps that may be performed to configure a web content display device for use on a retail shelf or other location.

FIG. 6 is a flowchart of a set of steps that may be performed to configure a web content display device for use on a retail shelf or other location. The device may be configured (400) to display content from a particular web location (e.g., a website or advertising platform interface) or a set of web locations based on some rotation. This may allow a device to display web content related to nearby products (e.g., a display positioned within a power tool section of a retail store may display web content from one or product pages for power tools from the retail store website), or display a rotation of possibly unrelated advertisements. The devices capabilities may also be pre-configured or determined (402), which may include determining an aspect ratio, resolution, or other display capabilities, or additional capabilities such as a camera, motion sensor, orientation sensor, or other capability that may be utilized by the system. The device orientation may also be pre-configured or determined (404), which may include manually configuring the device for a horizontal or vertical orientation, or automatically determining the orientation via a gyroscopic sensor. The device display areas may also be configured (406), which may include allotting or reserving portions of the displayable area for use by the web content system, or for other statically configured content. As an example, a portion of the usable display may be reserved to display a set of pre-configured content not delivered from the pre-existing web server or advertising server—such as a map of a retail store, a customer service number, emergency alert information, weather information, or other information, while the remaining portion of the usable display may be used for display of web content. In other examples, the entire usable display area may be used for web content, or may be divided and used to display web content from two separate web locations.

The devices actual and pseudo-location may also be pre-configured or determined (408), such as by manual configuration (e.g., configuring the device to have a pseudo location of Ohio, as part of its pseudo profile) or automatic configuration (e.g., using a GPS location or other location information from the device), or both (e.g., a GPS location may indicate a particular retail store and/or location within that retail store where the display is in use, and may use such information to retrieve a pre-existing pseudo profile or other configuration). The devices pseudo-requester profile may also be configured (410) based on the preceding configurations and determinations, and may be used when requesting web content as has been described.

Figure 7:
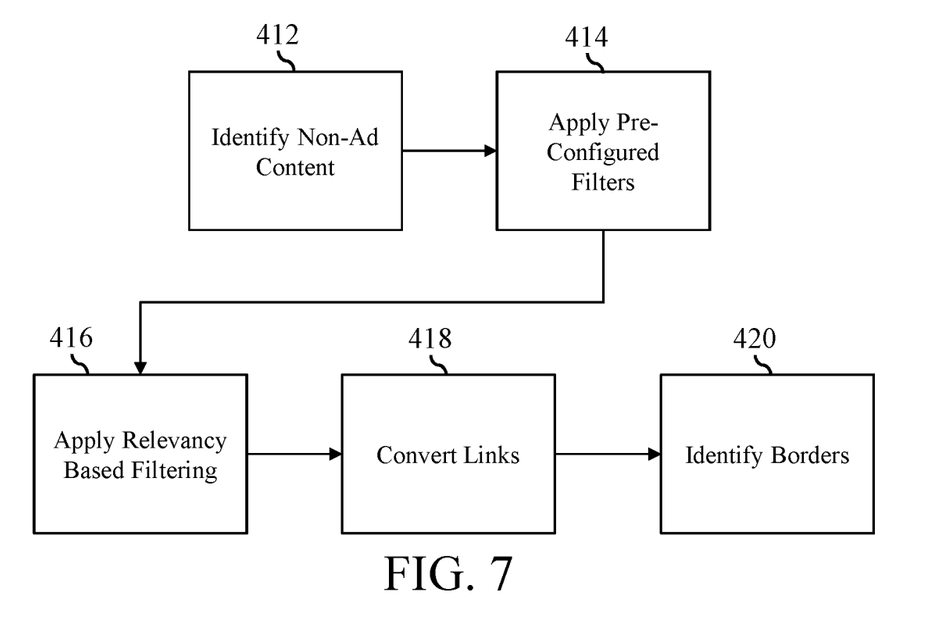
FIG. 7 is a flowchart of a set of steps that may be performed to convert non-advertisement content for display on a web content display device.

FIG. 7 is a flowchart of a set of steps that may be performed to convert non-advertisement content for display on a web content display device. The system may identify (412) non-ad content based upon analysis of the entire web content. This may be based upon a review of the web content and manual configuration, or may be performed programmatically by examining the source of the web content (e.g., content added by a script, or originating from a domain unrelated to the originally requested domain is likely advertising content). Pre-configured filters may then be applied (414) to the web content to exclude or include certain portions. As an example, where the web location is a product page, a manual configuration may identify only key portions of the product page (e.g., the product image, price, location, description, etc.) for inclusion, while other parts may be excluded (e.g., links to other products or sections of the website, user login controls, store search or product search controls). The system may also perform relevancy based filtering (416) based upon a pre-configured set of rules that match popular website design conventions (e.g., content that would display at the edge of a page may be excluded, while content that is centrally located may be included), or based upon a language analysis of website text (e.g., text content relating to websites generally, such as login text, search text, terms of use text may be excluded, while text relating to products or services may be included), for example.

The system may also convert (418) any remaining web links from clickable links into another form that is usable with the web content display device, such as a QR code or other digital code, or an RFID transmission or other wireless transmission. Since a user cannot select, click, or touch links displayed on the display device, remaining links are instead converted into a form that is readily transmissible to a particular user's smartphone or other device. In this manner, rather than interacting with the display device physically, the user could scan a QR code to be directed to the same location or experience as the original link, but instead on their own device browser or other software application.

The system may also perform a visual analysis and code analysis (e.g., examination of the html code or style sheet itself) of the images, text, and other visual elements of the web content in order to identify (420) natural borders, boundaries, separations, or other compartments within the web content. This may include identifying a colored bar, box, line, or other boundary between one part of the web content and another, or may include identifying an invisible div or other element within the content in which certain text is contained. Such border or boundary information may be usable in later restyling or reorganization of the web content to fit a new container, as elements separated by a boundary are likely to be independently movable without destroying their meaning.

Figure 8:
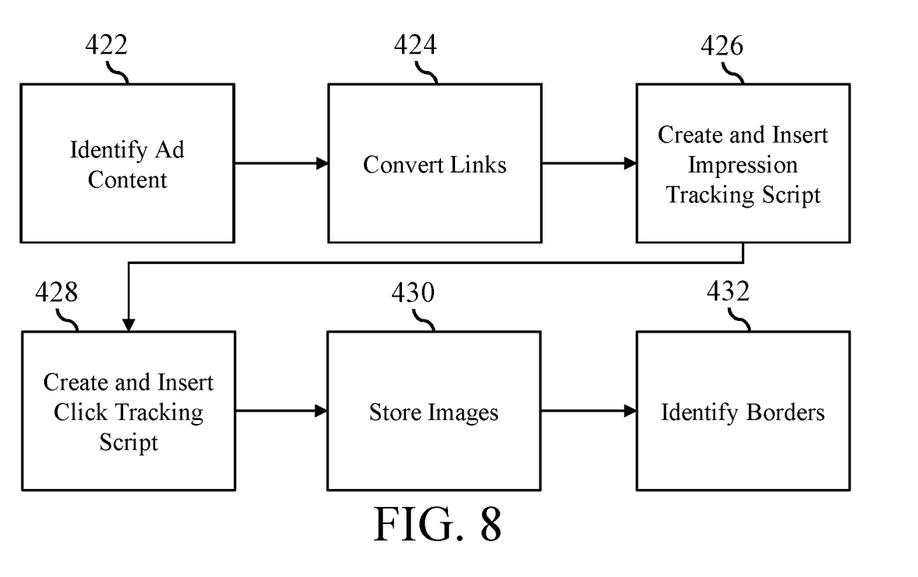
FIG. 8 is a flowchart of a set of steps that may be performed to convert advertisement content for display on a web content display device.

FIG. 8 is a flowchart of a set of steps that may be performed to convert advertisement content for display on a web content display device. The system may identify (422) advertisement content in the same or a different manner as non-advertisement content is identified (e.g., based on the origin, based on whether it was injected by a script, based on a manual configuration, etc.). Links in advertisement content may be converted (424) in the same or a similar manner as previously described, and may be converted in a manner that preserves, excludes, or replaces any additional tracking parameters or other unique information as may be necessary for integration with a particular pre-existing advertising system.

The system may also generate and insert (426) additional impression tracking scripts and/or click tracking scripts (428), as may be necessary for integration with a particular pre-existing advertising system. The system may also retrieve and store (430) images and other assets included in or referenced by the web content, in order to facilitate any later modification of those assets that may be performed. The system may also identify (432) any borders, boundaries, or other divisions within the advertisement content, as has been previously described.

Figure 9:
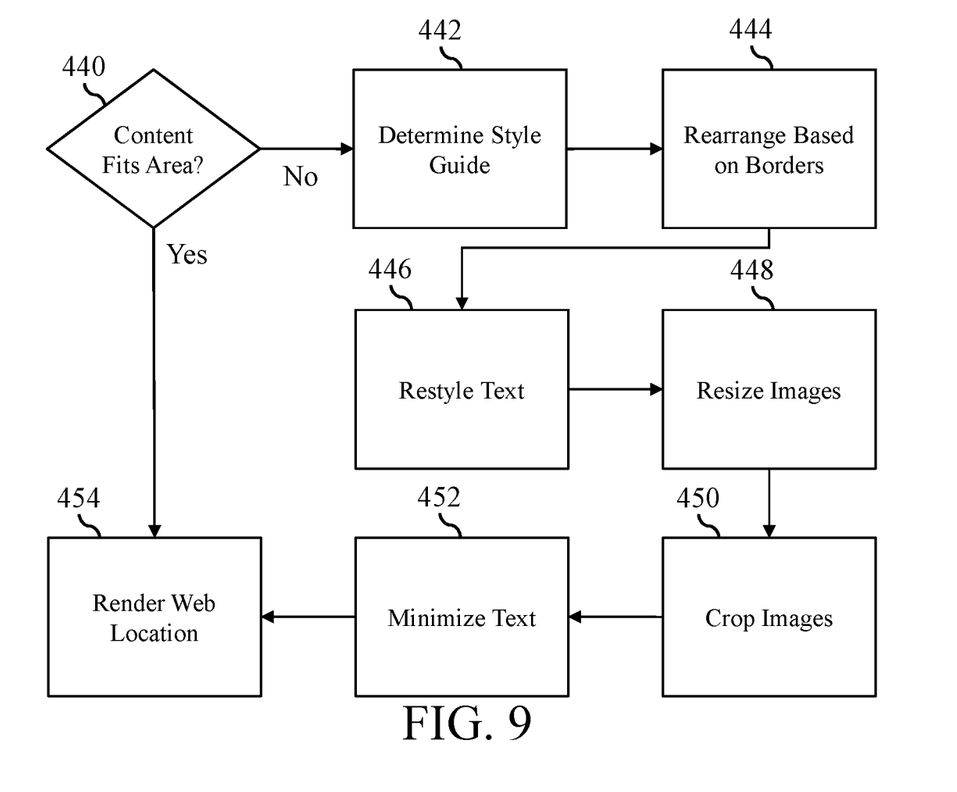
FIG. 9 is a flowchart of a set of steps that may be performed to position web content in a display area for display on a web content display device.

FIG. 9 is a flowchart of a set of steps that may be performed to position web content in a display area for display on a web content display device. For each display area of the web content display device (e.g., in some cases this may be only a single display area, or there may be two separate display areas with one dedicated to advertisement content, and one dedicated to non-advertisement content, or other variations) the system may determine (442) if there is any style guide that applies to modifications of the web content. The style guide may be provided by a particular retailer or other web content source, and may define certain fonts, font sizes, colors, and other styling conventions that must be used for content. This style guide may be manually configured as a set of limitations on further modification of web content in the process of fitting the web content to a display area. For example, where a brand style guide requires a certain font size and font style, the system will be prevented from using a different style or size even if it would allow the content to fit within the desired area.

The system may then rearrange (444) the remaining content based on identified borders, which may include moving bordered area that were previously vertically adjacent to instead be horizontally adjacent, or the opposite, in order to better fit within the display area. As a result, a "skyscraper" style advertisement or other web content may be reorganized to instead display as a "leaderboard" style, where the requesting web content display device is horizontally oriented instead of vertically oriented. The system may also restyle (446) text to reduce its size or area of coverage, or may resize (448) images to reduce their size. The system may also crop (450) images, which may include automatically cropping an image to a central portion to exclude edges, and which may be performed based upon an automatic image analysis of the image prior to cropping in order to identify objects of interest within the image and make sure that they are substantially retained as part of any cropping. The system may also minimize (452) text, which may include removing superfluous words, abbreviating words, or replacing common words or phrases with shorter words or phrases, which may be performed based upon generalized word dictionaries and rules, or may be performed based upon manually configured and store or device specific rules.

The system may perform some or all of the above adaptations sequentially, checking to see if the content fits the area after each modification, and then rendering (454) the web location via the display device once a fit is achieved. Thus—the order of adaptions may be selected to attempt the least impactful modification first, and proceeding to the more impactful modifications (e.g., text alteration or minimization) only if a fit still cannot be achieved. Once a fit is achieved (440), the web content display device may render (454) the remaining, altered web content to display a subset of the content from the original web location.

Figure 10:
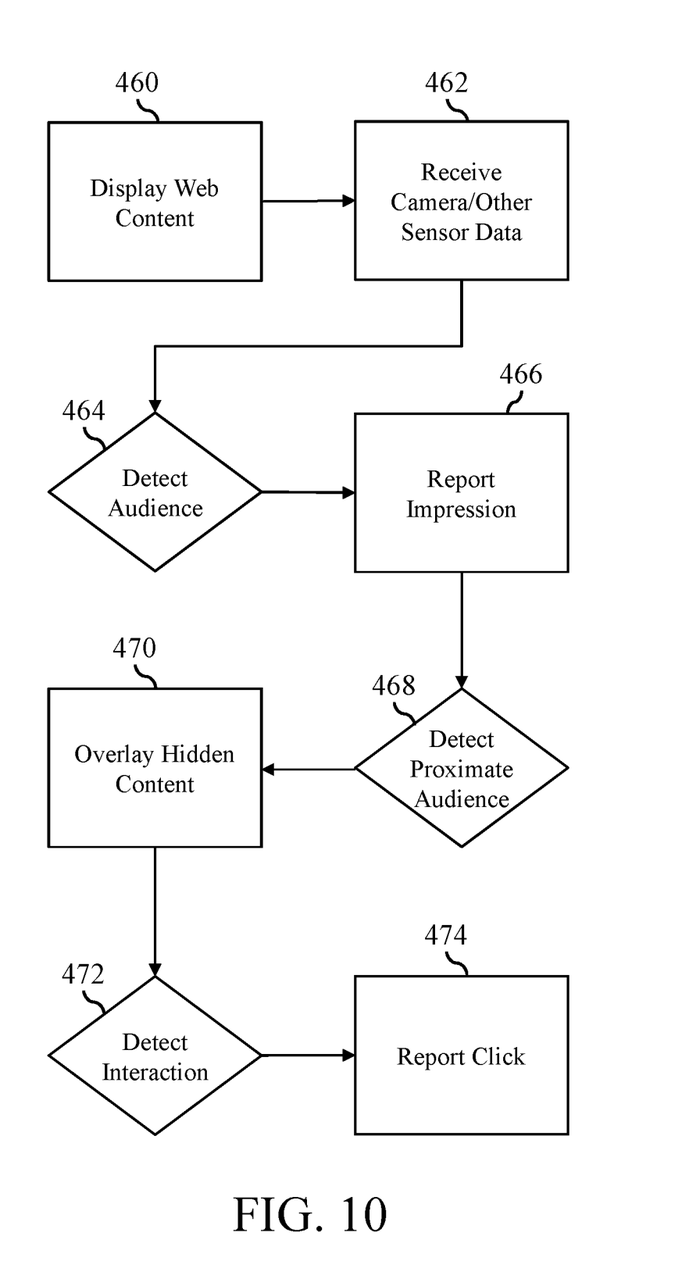
FIG. 10 is a flowchart of a set of steps that may be performed to provide interactive display of web content via a web content display device, and to provide indications of impressions and clicks via the web content display device.

FIG. 10 is a flowchart of a set of steps that may be performed to provide interactive display of web content via a web content display device, and to provide indications of impressions and clicks via the web content display device. The device may display (460) the web content, and then utilize front and/or rear facing cameras, motion sensors, or other sensors to receive (462) sensor data and detect (464) the presence of audience members within view of the display. As audience members are detected (464), the device may report (466) impressions to the pre-existing advertisement system—this may include executing additional scripts or code to make an additional API call to the pre-existing ad server identifying the advertisement that was being displayed, and the number of impressions detected while displayed.

In some implementations, web links converted to QR codes, optical codes, or other interactive transferable codes may be hidden within the rendered web content, and may only appear as overlays (470) when the presence of a proximate audience member is detected (468) (e.g., such as when image data from the camera, data from a proximity sensor, or another sensor indicates an audience member has approached, stopped in front, or is otherwise engaging closely with the display device). In such a case, a button that was, in the originally received and unmodified content, clickable to proceed to a linked web location may instead be overlaid (470) with or replaced by a previously hidden QR code, along with instructions for the viewer to scan the code to follow the link or receive more information (e.g., or in the case of an RFID or NFC communication, instructions for the customer to position their phone in a certain manner relative to the display device).

The system may also be configured to detect even closer interactions (472) with the display device, such as where a proximate audience member uses their smartphone to capture the QR code or an RFID communication. This may be performed by, for example, using a camera or proximity sensor of the display device to recognize (472) that an audience member has presented a phone and is directing a camera of the phone towards the appropriate location of the display device (e.g., the camera lens, infrared signals, light flash, or other discernable elements may be identified). The system may report (474) such interactions to the pre-existing advertisement server as clicks. In each case, click and impressions reporting may be configured and performed by the system so that the pre-existing advertising system recognizes them without modification (e.g., "spoofing" or faking the impression or click and reporting it to the advertising system), or may be performed so that the pre-existing advertising system only needs minimal modification to recognize them (e.g., creation of a simple interface that receives a unique advertisement ID and an indication of a click or impression).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A web content display device comprising:
   (a) a processor and a memory, wherein the processor is configured to provide an adaptive content interface that is configured to receive web content;
   (b) a display;
   (c) a communication device communicatively coupled with a pre-existing content server that provides web content;
   (d) one or more sensors; and
   (e) a mount for removable attachment to a retail shelf;
   wherein the processor is configured to:
   (i) receive a web content response from the pre-existing content server via the adaptive content interface, wherein the web content response comprises a set of web content configured to cause a web browser to display a web location associated with the web content response;
   (ii) determine a set of device capabilities that describe characteristics of the display;
   (iii) determine an orientation of the display;
   (iv) determine whether the web location can be displayed by the display based on the set of device capabilities and the orientation;
   (v) where the web location cannot be displayed by the display, perform one or more modifications to the set of web content to create an adapted set of web content that can be displayed by the display; and
   (vii) display the web location via the display based on the adapted set of web content.

2. The web content display device of claim 1, wherein the processor is further configured to:
   (a) create a web content request comprising the web location and a set of request parameters;
   (b) provide the web content request to the pre-existing content server; and
   (c) receive the web content response from the pre-existing content server in response to providing the web content request.

3. The web content display device of claim 2, wherein the processor is further configured to determine a device pseudo location, and include the device pseudo location in the set of request parameters.

4. The web content display device of claim 3, wherein the one or more sensors comprises a location sensor configured to provide a current location, and wherein the processor is further configured to determine the device pseudo location based on the current location.

5. The web content display device of claim 2, wherein the processor is further configured to determine a device pseudo user profile and include the device pseudo user profile in the set of request parameters, wherein the device pseudo user profile is preconfigured based upon an intended audience.

6. The web content display device of claim 1, wherein the processor is further configured to:
   (a) scan the set of web content and identify a set of clickable links;
   (b) for each clickable link of the set of clickable links, create an optical code based on a linked web location associated with that clickable link; and
   (c) modify the set of web content to replace each of the set of clickable links with the corresponding optical code for that clickable link.

7. The web content display device of claim 1, wherein the processor is further configured to modify the set of web content based on one or more rules, and wherein the one or more rules comprise two or more of:
   (a) a link replacement rule configured to replace clickable links with optical codes;
   (b) a pre-configured filter that defines specific portions of the set of web content received from the web location, and is configured to remove those specific portions from the set of web content; and
   (c) a relevancy based filter that is configured to identify low relevancy content within the set of web content based on spatial and textual analysis of the set of web content, and remove the identified low relevancy content from the set of web content.

8. The web content display device of claim 1, wherein the processor is further configured to, when performing one or more modifications to the set of web content to create the adapted set of web content:
   (a) identify one or more borders within the set of web content based on a machine vision analysis of set of web content when rendered, a code analysis of the set of web content, or both;
   (b) identify one or more sets of related web content based on the one or more borders; and
   (c) create the adapted set of web content based on the one or more sets of related web content.

9. The web content display device of claim 1, wherein the processor is further configured to:

(a) identify a set of advertisement content within the set of web content;
(b) identify a portion of the set of advertisement content that is configured to allow the pre-existing content server to track one or more impressions;
(c) when displaying the web location via the display based on the adapted set of web content, determine an audience size based on a sensor dataset produced by the one or more sensors, wherein the sensor dataset describes a number of individuals proximate to the display; and
(d) modify the portion of the set of advertisement content to report one or more impressions to the pre-existing content server based on the determined audience size.

10. The web content display device of claim 1, wherein the processor is further configured to:
(a) identify a set of advertisement content within the set of web content;
(b) identify a portion of the set of advertisement content that is configured to allow the pre-existing content server to track one or more clicks;
(c) when displaying the web location via the display based on the adapted set of web content, determine a number of clicks based on a sensor dataset produced by the one or more sensors, wherein the sensor dataset describes a number of interactions with the display; and
(d) modify the portion of the set of advertisement content to report one or more clicks to the pre-existing content server based on the determined number of clicks.

11. The web content display device of claim 1, wherein the one or more modifications include three or more of:
(a) modifying a style of the set of web content based on a preconfigured style guide that is associated with a retail location at which the retail shelf is placed;
(b) rearranging the set of web content based on one or more borders identified within the set of web content;
(c) resizing a set of displayed text of the set of web content;
(d) minimizing the set of displayed text based on a preconfigured set of text minimization rules;
(e) resizing a displayed image of the set of web content; and
(f) cropping the displayed image of the set of web content.

12. The web content display device of claim 11, wherein each of the one or more modifications is associated with an order of application, and the processor is further configured to:
(a) after determining that the web location cannot be displayed by the display, create a first adapted set of web content by performing a first modification of the one or more modifications based on the order of application;
(b) determine whether the web location can be displayed by the display based on the first adapted set of web content;
(c) where the web location cannot be displayed based on a prior adapted set of web content, create one or more subsequent adapted sets of web content by performing one or more subsequent modifications of the one or more modifications based on the order of application; and
(d) where the web location can be displayed based on the prior adapted set of web content, cease performing any subsequent modifications and display the web location via the display based on the prior adapted set of web content.

13. A method for adapting web content for display via a display device comprising, by a processor of the display device:
(a) receiving a web content response from a pre-existing content server via an adaptive content interface configured on the display device, wherein the web content response comprises a set of web content configured to cause a web browser to display a web location associated with the web content response;
(ii) determining a set of device capabilities that describe characteristics of a display of the display device;
(iii) determining an orientation at which the display is removably attached to a retail shelf based on one or more sensors of the display device;
(iv) determining whether the web location can be displayed by the display based on the set of device capabilities and the orientation;
(v) where the web location cannot be displayed by the display, performing one or more modifications to the set of web content to create an adapted set of web content that can be displayed by the display; and
(vii) displaying the web location via the display based on the adapted set of web content.

14. The method of claim 13, further comprising:
(a) creating a web content request comprising the web location and a set of request parameters;
(b) providing the web content request to the pre-existing content server; and
(c) receiving the web content response from the pre-existing content server in response to providing the web content request.

15. The method of claim 14, further comprising determining a device pseudo location and including the device pseudo location in the set of request parameters.

16. The method of claim 15, wherein the one or more sensors comprises a location sensor configured to provide a current location, further comprising determining the device pseudo location based on the current location.

17. The method of claim 14, further comprising determining a device pseudo user profile and including the device pseudo user profile in the set of request parameters, wherein the device pseudo user profile is preconfigured based upon an intended audience.

18. The method of claim 13, further comprising:
(a) scanning the set of web content and identifying a set of clickable links;
(b) for each clickable link of the set of clickable links, creating an optical code based on a linked web location associated with that clickable link; and
(c) modifying the set of web content to replace each of the set of clickable links with the corresponding optical code for that clickable link.

19. The method of claim 13, wherein the one or more modifications include three or more of:
(a) modifying a style of the set of web content based on a preconfigured style guide that is associated with a retail location at which the retail shelf is placed;
(b) rearranging the set of web content based on one or more borders identified within the set of web content;
(c) resizing a set of displayed text of the set of web content;
(d) minimizing the set of displayed text based on a preconfigured set of text minimization rules;
(e) resizing a displayed image of the set of web content; and
(f) cropping the displayed image of the set of web content.

20. The method of claim 19, wherein each of the one or more modifications is associated with an order of application, the method further comprising:
  (a) after determining that the web location cannot be displayed by the display, creating a first adapted set of web content by performing a first modification of the one or more modifications based on the order of application;
  (b) determining whether the web location can be displayed by the display based on the first adapted set of web content;
  (c) where the web location cannot be displayed based on a prior adapted set of web content, creating one or more subsequent adapted sets of web content by performing one or more subsequent modifications of the one or more modifications based on the order of application; and
  (d) where the web location can be displayed based on the prior adapted set of web content, ceasing performing any subsequent modifications and displaying the web location via the display based on the prior adapted set of web content.

* * * * *